Aug. 13, 1968  R. J. SMITH  3,396,664

FLOATING RING VISCOUS PUMP

Filed Sept. 28, 1966  2 Sheets-Sheet 1

INVENTOR:
RICHARD J. SMITH,
BY *Robert J. Bird*
HIS ATTORNEY.

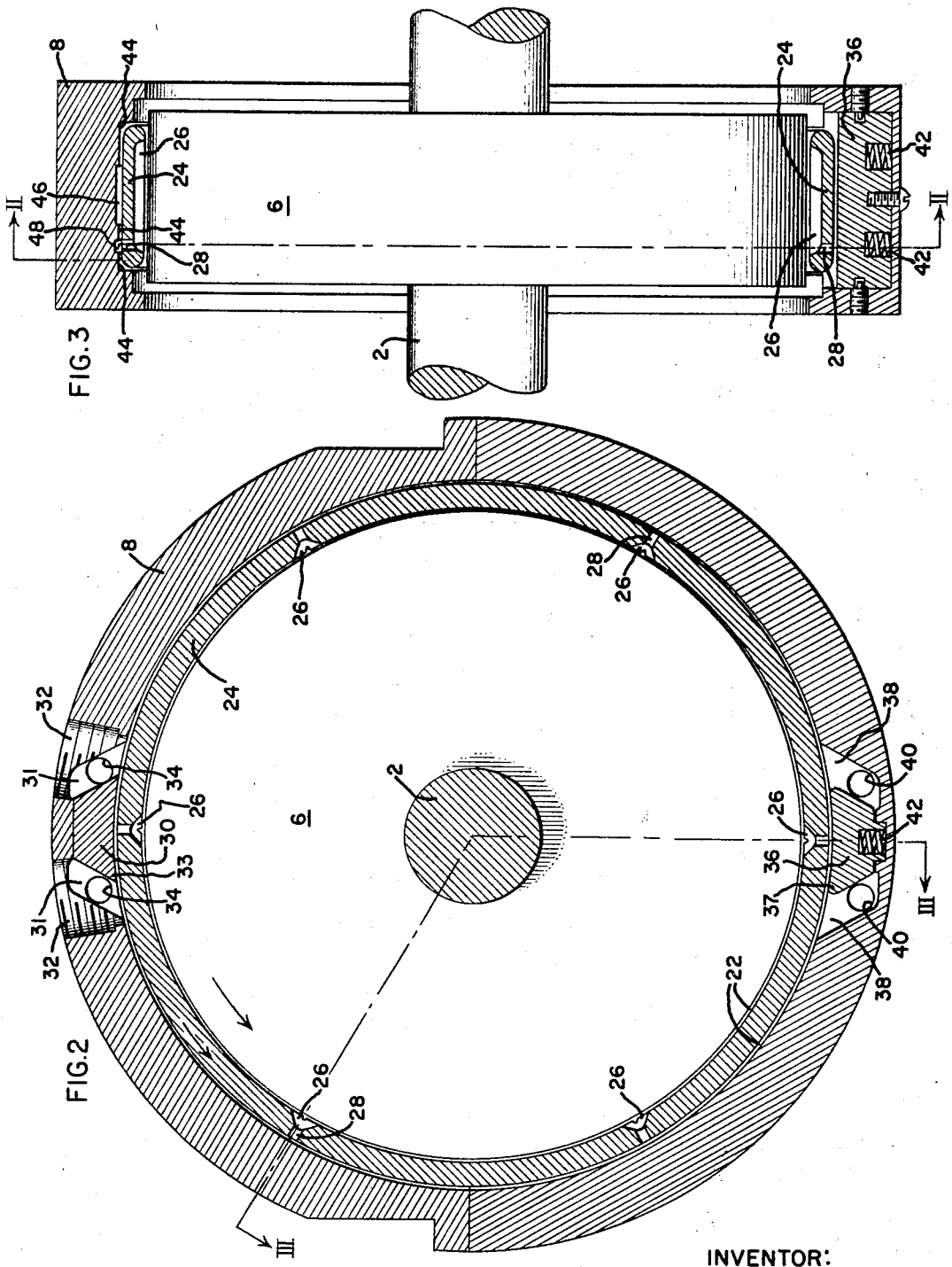

United States Patent Office 3,396,664
Patented Aug. 13, 1968

3,396,664
FLOATING RING VISCOUS PUMP
Richard J. Smith, North Wilmington, Mass., assignor to General Electric Company, a corporation of New York
Filed Sept. 28, 1966, Ser. No. 582,593
7 Claims. (Cl. 103—84)

ABSTRACT OF THE DISCLOSURE

Viscous drag pump having pumping ring disposed between pump, disc and pump casing.

---

This invention is related to viscous fluid pumps. More particularly, it is related to viscous fluid pumps which operate on a "viscous drag" principle.

Viscous drag fluid pumps are known in which a rotating disc at least partly submerged in a viscous fluid, rotates within a casing. At some point around the circumference of the casing interior, a scraper is urged against the disc which, by rotating through the viscous fluid, is caused to continually carry away the fluid. The scraper then directs the flow of the carried fluid to a reservoir or tank. The amount of fluid that can be pumped by a viscous drag pump is proportional to the clearance between its disc and casing and the average velocity of the fluid. Such devices have been used, for example, in bearings where a journal bearing itself will act as a viscous drag oil pump for the purpose of circulating its own lubricating oil. U.S. Patent 2,351,431, Irons discloses one such example of a viscous drag shaft pump-bearing. One typical application for such a combination pump-bearing is in the journal bearings of a large turbine-generator set.

For a clearer understanding of the present invention, it will be helpful to consider the analogous fluid behavior in a journal bearing. It is known in the bearing art that, for predictability and lubricating effectiveness, the relative speed of a journal within a bearing, that is, the relative surface velocity, must be kept below that point at which the oil flow within the journal bearing between the surfaces changes from a laminar flow to a turbulent flow. That is to say, that for a given r.p.m., there is a size above which a journal bearing will suffer turbulent oil flow and below which a journal bearing will enjoy laminar flow of the same lubricating oil. Similarly, a viscous drag pump is effective as long as laminar flow is maintained in the fluid between its disc and casing. If the fluid between the pump disc and casing were to be in a turbulent condition, pumping effectiveness is reduced and the system is generally unpredictable.

Accordingly, it is one object of the present invention to provide a viscous drag fluid pump which will sustain laminar fluid flow through substantially double the speed range of a comparable size pump of the prior art.

Another object of the present invention is to provide a viscous drag pump which conversely can be built at substantially double the diameter of a prior art pump at the same speed rating and which will not suffer turbulent fluid flow in operation.

Other objects, advantages and features of the present invention will become apparent from the following description of one embodiment thereof, when taken in connection with the accompanying drawing.

Briefly stated, the present invention is practiced in one form by a viscous drag fluid pump having a disc rotating within a casing, and having a floating ring in the clearance space between the disc and casing. A scraper at one point on the inner periphery of the casing is positioned toward the surface of the floating ring to direct the viscous fluid therefrom. The floating ring is carried by fluid action at a speed intermediate the speed of the disc and that of the stationary casing, generally about one-half the speed of the disc. The slower-rotating floating ring acts as the viscous drag device carrying the viscous fluid around the inner periphery of the casing until it reaches the scraper at which point it is directed through a suitable flow channel.

In the drawing:

FIG. 2 is a sectional elevation of the essential elements of the floating ring viscous drag pump of the present invention, and taken generally along the line II—II of FIG. 3.

FIG. 3 is a sectional elevation taken along the line III—III of FIG. 2.

Figure 1:
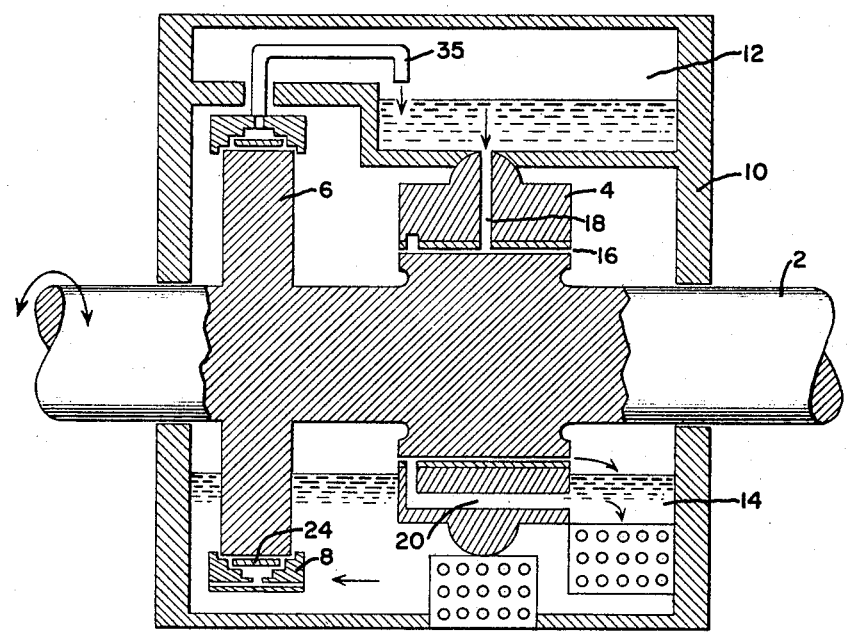
FIG. 1 is a schematic view showing the viscous drag pump of the present invention in its relation to a shaft and a journal bearing.

In FIG. 1, a rotatable shaft as, for example, a turbine or generator shaft, is shown at 2. Shaft 2 is supported by journal bearing 4. Shaft 2 also includes a disc 6 which is rotatable within a stationary casing 8. An enclosure 10 is disposed around shaft 2 and houses the journal bearing 4, the disc 6, and the casing 8 therein.

Enclosure 10 defines a lubricating oil discharge reservoir 12 and a lubricating oil feed reservoir 14. Journal bearing 4 and shaft 2 define a clearance 16 therebetween. Journal bearing 4 also defines lubrication passages 18 and 20 which communicate with the lubricating oil discharge reservoir and the feed reservoir respectively.

The foregoing is by way of example of a possible environment for the pump of the present invention which will now be described in more detail.

The disc 6 of the viscous drag pump is actually a part of shaft 2 and may or may not be the same diameter as shaft 2. FIG. 2 shows disc member 6 rotatable in either direction on shaft 2 within casing 8. Casing 8 hangs on the disc 6 and is restrained from rotation by a pin or other means not shown. Between disc 6 and casing 8 is a clearance 22 having a ring 24 disposed therein and also hanging on disc 6. Ring 24 has a series of transversely directed grooves 26 on its inner circumference and spaced therearound. A passage 28 extends through the ring 24 from the root of each groove 26 at one end thereof.

Nonrotating casing member 8 has a radially extending scraper member 30 in its upper portion which extends radially inward toward ring member 24. Scraper 30 has sharp corners or edges 33. On each side of scraper member 30 is a passage or port 32 which extends in a radial direction through casing 8 and is threaded or otherwise made suitable for connection to an external conduit such as 35 in FIG. 1. In addition to radially extending passages 32, there may also be axially directed outlets 34 extending from the chamber 31 at each side of scraper 30 and in each axial direction.

Similarly, at the lower portion of casing 8 is a scraper 36 having a chamber 38 on each side thereof and axial passages 40 extending from each end of each chamber 38. Bottom scraper 36 has rounded corners 37 and is spring-biased against ring 24 by a coil spring 42.

Within casing 8 and in the area adjacent ring 24 (see FIG. 3), the casing 8 has a reference-level surface 44 and two relatively indented circumferential surfaces which are a pumping groove 46 and a lubricating groove 48.

The principle of operation of the foregoing structure will now be described. The ring 24 corresponds to the disc or pumping element of prior art viscous drag pumps. That is to say, as ring 24 rotates within the enclosure 10 which contains oil at a level to submerge a part of ring 24, the viscous fluid in contact with the ring 24 adheres to it and is carried by it to the uppermost point of its travel where it is scraped off by scraper 30 and directed into one or more of the passages 32 and 34. That fluid which is carried in pumping groove 46 is for discharge to some external point as, for example, through conduit 35 for lubrication of a bearing. That fluid which is carried in lubricating groove 48 is intended for the lubrication of the viscous drag pump unit itself. After discharging into chambers 31, ring 24 continues its revolution, returning to the bottom at which point it again picks up viscous fluid through chambers 38 and again carries it upward. Spring-biased scraper 36 serves to maintain small clearances between the scrapers and the ring. The rounded corners 37 on scraper 36 allow an oil film to remain on ring 24 as it passes scraper 36. Since the scrapers are symmetrical, that is, the same from both sides, the pump is operable in either direction of rotation. It is contemplated that the pump could be rotated 180° after considerable use results in a wearing of the top portion of the casing causing the operating clearances to change.

The fluid which is entrained on ring 24 in the area of lubricating groove 48 is carried similarly upward and stopped when it hits the scraper. The fluid being forced against the scraper develops pressure, forcing it through the radial holes 28 in the ring and into the spreader grooves or axial grooves 26 on the inside diameter of the ring. This lubricates between the disc and the ring, the fluid then flowing axially out each end. The relative speed between ring 24 and casing 8 is such that the viscous fluid in clearance 22 therebetween enjoys laminar flow.

As between disc 6 and ring 24, the fluid entrained between them drags the ring 24 around with it by its viscosity. The speed of ring 24 relative to disc is dependent on the clearance between ring 24 and disc 6. Similarly, the speed of ring 24 relative to casing 8 is dependent on the clearance between the ring 24 and casing 8. That is, that ring 24 rotates at a speed slower than that of disc 6 and of course higher than that of stationary casing 8, depending on its clearances relative to the two members. Calculations indicate that a ring having an inside clearance on the order of 25–35% greater than its outside clearance will have substantially equal moments acting on it by the viscous action of the fluid. In that case then, it will revolve at approximately half the speed of the disc if the casing is fixed.

Thus, it will be apparent that even though the disc 6 is rotating at such a speed that, without the ring 24, there would be turbulent fluid flow in the clearance between disc 6 and casing 8, the presence of the ring 24, rotating as it does at half speed, results in a laminar flow between the disc and the ring, and between the ring and the casing. Accordingly, it will be appreciated that a viscous drag pump has herein been disclosed which is capable of maintaining laminar flow at double the relative surface speed between a disc and a casing as compared to prior art devices.

Many modifications of the present invention are possible as, for example, scrapers 30 and 36 might both be spring-biased against the ring 24, or neither might be so biased. Also, the various passages leading to and from the fluid intake and outlets respectively might be used in various combinations. The environment shown in FIG. 1 is not limiting, being shown merely as an example of one use for such a pump. It would be possible to totally enclose the pump and feed fluid to it through some passage similar to ports 32. It would also be possible, for instance, using the FIG. 1 environment as a background, to tap a plurality of lines from outlet passages 32 and 34 in order to convey lubricant or some other viscous fluid to distant points as, for example, to lubricate gears or other bearings in the system.

It may occur to others of ordinary skill in the art to make such modifications which will remain within the concept and scope of the present invention and will not constitute a departure therefrom. Accordingly, it is intended that the invention be not limited by the details in which it has been described but that it encompass all within the purview of the following claims and such equivalent structure as falls within the true scope of the invention.

What is claimed is:

1. A viscous drag pump comprising:
    an inner rotatable disc,
    a floating ring disposed loosely around the periphery of said disc, and a non-rotatable outer casing disposed loosely around the periphery of said ring,
    said outer casing having a first scraper extending radially inward and a passage through said casing adjacent the leading edge of said scraper, said outer casing having a second scraper circumferentially displaced from said first scraper and spring-biased against said ring to urge said second scraper against said ring.

2. A viscous drag pump according to claim 1 in which said second scraper in said casing is diametrically opposed to said first scraper.

3. A viscous drag pump according to claim 2 in which said pump is partially immersed in a viscous fluid reservoir and said casing is open at its axial faces so as to permit communication of said disc with said viscous-fluid reservoir.

4. A viscous fluid pump according to claim 2 in which said floating ring is transversely grooved on its inner surface, with a radial passage through said ring at the root of each groove, and in which said outer casing is circumferentially grooved on its inner surface, having a pumping groove and a lubricating groove, said radial passage in axial registry with said lubricating groove.

5. A viscous fluid pump comprising:
    an inner rotatable disc,
    a floating ring loosely surrounding said disc, and
    a nonrotating outer casing loosely surrounding said ring, the axes of said disc, ring, and casing being parallel,
    said floating ring having a plurality of transverse grooves on its inner surface and a radial hole through said ring extending into the root of each of said grooves,
    said outer casing being open in its axial faces to permit free communication of said disc and ring with a viscous-fluid reservoir,
    said outer casing having circumferential grooves on its inner surface, including a pumping groove and a lubricating groove, said lubricating groove in axial registry with said radial holes through said ring,
    said outer casing having a pair of diametrically opposed inwardly extending scrapers, the first of said scrapers mounted adjacent a discharge port through said casing communicating on its inner end with said pumping groove at the leading edge of said first scraper, the second of said scrapers being spring-biased against said floating ring to maintain close relationship between said ring and said second scraper.

6. A viscous drag pump according to claim 5 in which said first scraper has a sharp leading edge to scrape fluid from said floating ring and said second scraper has a rounded leading edge to guide fluid thereunder.

7. A viscous drag pump as defined in claim 5 in combination with:
   an oil feed reservoir communicating with a portion of said disc and ring,
   an oil discharge reservoir communicating with said discharge port, and
   a shaft journal bearing disposed to receive oil from said discharge reservoir and to drain oil into said feed reservoir.

References Cited

UNITED STATES PATENTS

| | | | |
|---|---|---|---|
| 1,457,831 | 6/1923 | Guetl | 308—127 |
| 1,496,849 | 6/1924 | Howarth | 308—127 |
| 2,360,737 | 10/1944 | Steinmann | 308—128 |
| 2,969,020 | 1/1961 | Fazekas | 103—84 |
| 3,262,334 | 7/1966 | Edwards | 308—128 |

HENRY F. RADUAZO, *Primary Examiner.*